United States Patent
De Matos et al.

(10) Patent No.: US 6,346,223 B2
(45) Date of Patent: Feb. 12, 2002

(54) PROCESS FOR THE PRODUCTION OF TITANIUM CONCENTRATE FROM ANATASE ORES WITH HIGH UTILIZATION OF THE IRON CONTENTS OF THE ORE

(75) Inventors: Marcelo De Matos; Lino Rodrigues De Freitas; Ronaldo De Moreira Horta, all of Belo Horizonte-MG (BR)

(73) Assignee: Companhia Vale Do Rio Doce, Minas Gerais (BR)

( * ) Notice: Subject to any disclaimer, the term of this patent is extended or adjusted under 35 U.S.C. 154(b) by 0 days.

(21) Appl. No.: 09/174,773

(22) Filed: Oct. 19, 1998

(30) Foreign Application Priority Data

Oct. 17, 1997 (BR) .......................... PI 9704435

(51) Int. Cl.$^7$ .......................... C01G 23/00; C22B 34/00; B03C 1/30
(52) U.S. Cl. .............................. 423/84; 423/82; 423/86; 241/23; 241/24.14; 209/38
(58) Field of Search ............................ 423/69, 71, 80, 423/82, 83, 84, 86; 241/24.1, 24.14, 23; 209/12.1, 38

(56) References Cited

U.S. PATENT DOCUMENTS

| | | | |
|---|---|---|---|
| 3,856,512 A | * 12/1974 | Palmer et al. | ................ 423/84 |
| 4,176,159 A | * 11/1979 | Paixao et al. | ................ 423/80 |
| 4,256,266 A | * 3/1981 | Magalhaes | |
| 4,362,557 A | * 12/1982 | Elger et al. | .................... 423/84 |
| 4,505,886 A | * 3/1985 | Cody et al. | .................... 423/82 |
| 5,011,666 A | * 4/1991 | Chao et al. | .................... 423/82 |
| 5,085,837 A | * 2/1992 | Chao et al. | .................... 423/82 |
| 5,679,131 A | * 10/1997 | Obushenko | ................ 423/84 |

FOREIGN PATENT DOCUMENTS

| | | | | |
|---|---|---|---|---|
| WO | 95/28503 | * 10/1995 | ................ | 423/84 |

\* cited by examiner

Primary Examiner—Steven Bos
(74) Attorney, Agent, or Firm—Rosenman & Colin LLP

(57) ABSTRACT

A process for the production of titanium concentrates from anatase ores with high utilization of the iron contents of the raw ore involving the steps of calcining mechanically treated ore in the presence of an alkali metal carbonate followed by dilute leachings in both alkaline and acid media. No reducing agents are employed during calcination, avoiding the iron contents of the ore to be solubilized in the leaching steps. The final concentrate, which is rich in titanium and iron and has a low content of impurities, can be used as a raw material for the production of titanium slag.

15 Claims, 2 Drawing Sheets

PROCESS FOR THE PRODUCTION OF TITANIUM CONCENTRATE FROM ANATASE ORES WITH HIGH UTILIZATION OF THE IRON CONTENTS OF THE ORE

DESCRIPTION OF THE INVENTION

The present invention discloses an innovative process for producing a titanium concentrate having contents of titanium and iron close to those usually found in ilmenite concentrates. Said material, herein called "artificial ilmenite", is obtained by applying pyro and hydrometallurgical processes to the treatment of highly impure titanium ore, a class into which can be found in Brazilian ores, the predominant titanium source of which is anatase.

Figure 1:
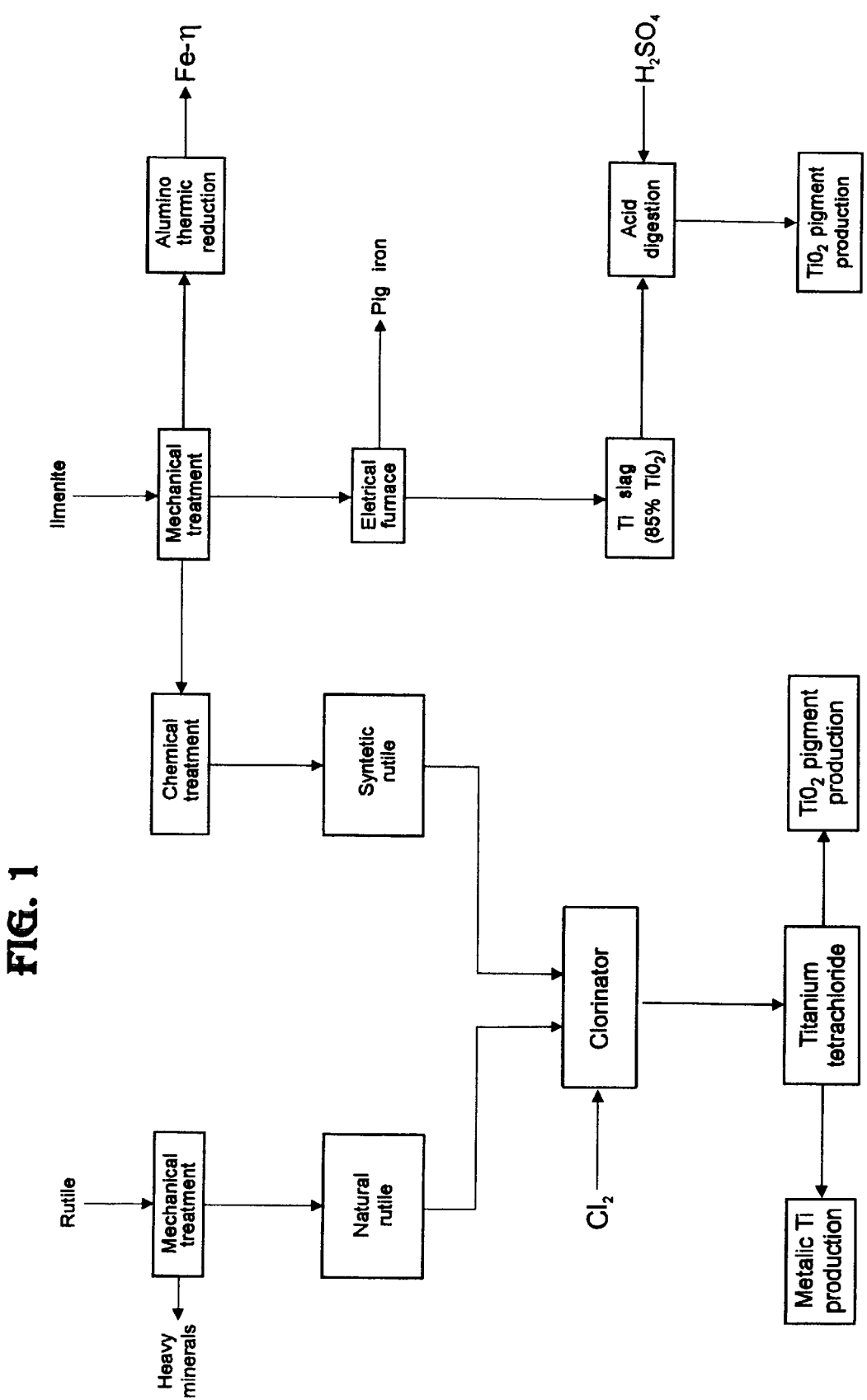

The processes for the production of titanium and its compounds are schematically shown in FIG. 1. Presently, there are only two ore sources commercially exploited around the world: rutile ($TiO_2$) and ilmenite ($FeTiO_3$). Several alternatives involving physical and/or chemical beneficiation processes for concentrating such ores have been proposed (HENRY, J. L. et all., "Bureau of Mines Development of Titanium Production Technology", Bulletin 690, U.S. Bureau of Mines, 1987). The products obtained this way have essentially two destinations: direct production of metallic titanium and production of titanium pigment. The latter is presently carried out through the so-called sulphate and chloride processes, wherein the latter process is the main one and that with the highest growing potential.

Among the items shown in FIG. 1, the production of titanium slag (85% $TiO_2$ equivalent) is of utmost importance due to the tact that this material can be directly used in the two presently available routes for the production of $TiO_2$ pigment, by far the main application of titanium based raw materials. The following advantages can be mentioned for the production of slag: possibility of using titanium ore with a lower impurity content (ilmenite), utilization of the iron content of said ore through the production of pig iron, in addition to the already mentioned advantage of producing a material which can employed in the existing processes for the production of pigment. Estimates for the titanium slag consumption by the pigment industry show a present increase of up to 600,000 metric tons until year 2000 (ANON., "Titanium Minerals 1994—A Complete Cost Analysis", AME Mineral Economics, 1994).

Brazil possesses approximately 20% of the known titanium ore reserves and the main concentration thereof can be found in alkaline pipes in the western region of Minas Gerais State and south of Goias State. The ore, that covers phosphate beds, is of complex nature, being the result of alterations in different types of rocks. The main difficulty in developing a process for recovering titanium amounts from this type of ore is the selection of single operations that show high efficiency and selectivity simultaneously. As a consequence, when trying to produce a concentrate rich in titanium the overall mass recovery falls dramatically, rendering the process uneconomical. Treatments of such kind have been tried in the past (PAIÃO, J. M. J. and MENDONÇA, P. A. F., "Process for Concentrating Titanium Ores", Brazilian patent PI 7507645; (PAXÃO, J. M. J. and MAGALHÃES, G., "Process for Beneficiating Titanium Ores", Brazilian patent PI 7604532), resulting in alternatives of limited practical use, since mass recoveries have been comprised within the 5 to 10% range only.

The process here presented has been developed with the main purpose of overcoming the severe drawbacks found in the processes avaliable to date for the treatment of Brazilian anatase ores. As shown later; the solution for such a problem is obtained through by the utilization of iron amounts usually associated to titanium in the several anatase deposits found in Brazil.

The objective of the present process is the recovery on a titanium concentrate having a chemical composition similar to that of ilmenite; this concentrate being the intermediate raw material for the production of titanium slag. On the other hand, the process for producing slag is based on the carbothermic reduction of a part of the titanium contained in the ore—leading to a material with a stoichiometry close to $Ti_3O_5$—and all the iron from the concentrate to FeO—contained in the slag phase—and metallic Fe. Other elements such as aluminium, silicon, alkaline and alkaline-earth metals are not reduced and thus constitute deleterious impurites that must be removed from the titanium raw material. Phosphorus is also an undesirable impurity due to the contamination caused in the resulting pig iron. As can be seen hereinbelow, the process developed makes it possible to obtain a high degree of removal of such impurities, thus providing concomitantly a large recovery of titanium and iron contained in the raw ore.

The process described in the present invention is based on the use of the following sequence of operations to the processing of titanium ores: disintegration, screening through 6 mm, crushing, classification, low intensity magnetic separation for removing coarse magnetite, attrition and slimes removal for discarding the minus 74 µm (200 mesh) fraction, calcination in the presence of sodium carbonate ($Na_2CO_3$) and/or potassium carbonate ($K_2CO_3$), comminution of the calcination product to a particle size below 1 mm, leaching in alkaline medium (pH in excess of 10) and later acid leaching. Each of such steps is detailed below.

First of all, the raw ore is subjected to a disintegration step in a drum washer, followed by screening in a vibrating screen having a 6 mm (¼") opening, and crushing in a conical crusher. The screen operates in closed loop with the crusher, that is, only the >6 mm fraction is crushed. The screened material is classified in a spiral classifier which is adjusted for providing a product with a particle size above 48 mesh (300 µm). The overflow of the classifier with a particle size of −48 mesh is discarded.

The classified ore is then subjected to a low intensity magnetic separation (approximately 800 Gauss), preferably in a wet drum separator. The magnetic fraction is discarded. The non magnetic fraction undergoes a slimes removal operation in an attrition cell with the purpose of removing clay-minerals particles that remain adhered to the surface of the anatase grains. The ore from the attrition step is classified in a spiral classifier adjusted in such a way that a 200 mesh (74 µm) cut can be obtained. The overflow of the classifier, with a particle size of—200 mesh, is discarded. For the purposes of the present invention, the material subjected to the above mentioned sequence of operations, that is, disintegration, screening, crushing, classification, magnetic separation, attrition and slimes removal, is called mechanical concentrate.

In the calcination step, the mechanical concentrate is mixed with sodium carbonate ($Na_2CO_3$) and/or potassium carbonate ($K_2CO_3$) and heated to a temperature within the 900 to 1300° C. range, preferably 1100° C., being kept at the desired temperature for a time period between 20 to 60 minutes, preferably 30 minutes, in an oxidizing environment. The amount of carbonate to be added, either as powder or in aqueous solution, depends on the content of $Al_2O_3$ and $SiO_2$, ranging from 60 to 150 kg per metric ton of ore to be treated. The main purpose of this calcination is to produce soluble sodium compounds ($Na_2O.Al_2O_3$, $Na_2O.P_2O_5$, $Na_2O.SiO_2$ among others) at elevated temperatures, which are removed in the leaching steps that follow. No agglomeration or sintering was observed in the ore during calcination. Therefore, a simple disintegration of the calcined product is required in order to match its grain size with the next leaching step. In laboratory scale, this is carried out by compressing the calcined product in a rubber mantle, whereas in industrial scale it can be carried out through the use of conventional comminution equipment (hammer or jaw crusher) and care should be taken when regulating the operation of said equipment in order to avoid the generation of excessive fines. The calcined disintegrated product with a particle size below 1 mm feeds the leaching operations described hereinbelow.

The first leaching step is performed in alkaline medium (pH>10) by using as a solvent any alkaline substance with a concentration lower than 50 g/L such as NaOH, KOH, $Na_2CO_3$ or $K_2CO_3$. In this step, the temperature is in the 60 to 90° range, preferably 70° C., and the time is 1 hour. After leaching, the material is filtered, and the liquor is reserved for the production of $Al_2O_3$, $P_2O_5$ or $SiO_5$ and the recovery of the alkaline compound used. The solid residue of this step feeds the next step the acid leaching.

The product of the alkaline leaching is then subjected to leaching with HCl or $H_2SO_4$, preferably HCl, at concentrations ranging from 30 to 50 g of HCl per liter of solution, and preferably lower than 50 g/l. The temperature is in the 60 to 90° C. range, preferably 70° C., for a period of 20 to 240 minutes, preferably 60 minutes. After leaching, the pulp is filtered and the liquor is used in the recovery of rare earth compounds contained in the initial ore, and the solid, after drying, constitutes the final product, which is called artificial ilmenite. For the purposes of the present invention, the sequence of operations including calcinations, disintegration, alkaline leaching and acid leaching shall be referred to as thermo-chemical treatment.

Figure 2:
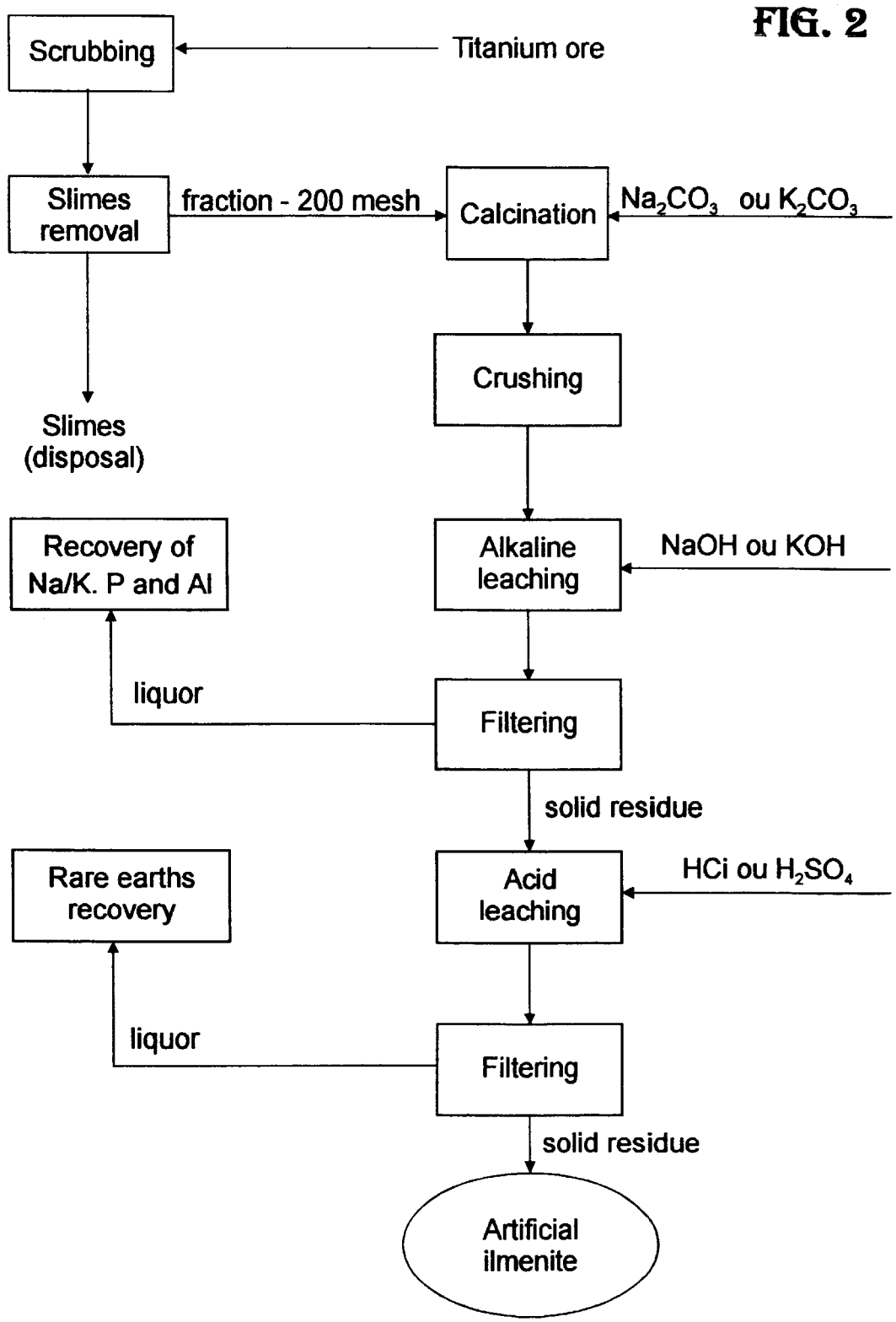

The spirit and scope of the present invention may be fully understood based on the examples given below. It should be noticed that said examples are merely illustrative and shall not limit the process developed. The main steps of the process are shown in the schematic representation of FIG. 2.

EXAMPLE 1

An anatase ore sample was subjected to the mechanical processing steps with the exception of the attrition and slime removal operations. That is, its initial processing included disintegration, screening, crushing, classification and magnetic separation. Said mechanical concentrate was then calcined to 1100° C. for 1 hour in the presence of soda ash ($Na_2CO_3$) by using an amount of 95 kg of carbonate per metric ton of ore, corresponding to the sodium required for reacting with all aluminium, silicon and phosphorus contained in the mechanical concentrate. After disintegration, the calcined product underwent leaching with caustic soda (25 g/L NaOH) at 70° C. and 35% solids for 1 hour, followed by leaching with, hydrochloric acid (30 g/L HCl), also at 70° C., 35% solids and 1 hour. The material from the leachings, after separation of the liquor through filtration and drying, is the final product. The chemical compositions of the raw ore, mechanical concentrate and final product are given in Table 1, where are also shown the weights of each of said materials along the processing. It can be seen that the proposed process leads to high overall recovery of titanium and iron, 100% and 94% (compared to the mechanically treated product), respectively, with a high extraction of the main contaminants. However, it is possible to further increase the removal of impurities through the inclusion of attrition and slimes removal operations at the end of the mechanical treatment, thus bringing forth a higher efficiency in the thermo-chemical treatment, as shown in Example 2.

TABLE 1

Example 1
contents (% by weight) of main constituents in
the ore in different steps of the concentration process

|  | (1) | (2) | (3) |
|---|---|---|---|
| weight, kg | 100 | 30.7 | 26.9 |
| $TiO_2$ | 26.6 | 40.5 | 46.5 |
| $Fe_2O_3$ | 43.2 | 37.7 | 40.5 |
| $Al_2O_3$ | 8.72 | 6.39 | 5.08 |
| $P_2O_5$ | 4.56 | 4.42 | 1.21 |
| $SiO_2$ | 3.14 | 2.16 | 0.83 |
| CaO | 0.44 | 0.84 | 0.29 |
| BaO | 0.77 | 0.89 | 0.19 |
| MgO | 0.85 | 0.73 | 0.73 |
| MnO | N.A. | 0.68 | 0.38 |
| Others | 11.72 | 5.69 | 4.29 |

(1)—raw ore
(2)—concentrate after magnetic separation
(3)—final concentrate (after thermo-chemical treatment)
N.A.—not available

EXAMPLE 2

The same anatase ore sample was subjected to an identical sequence of mechanical processing operations described in Example 1, including attrition and slimes removal steps. Next, it was calcined at 1000° C. for 1 hour in the presence of soda ash ($Na_2CO_3$), by using an amount of 80 kg of carbonate per metric ton of ore. This amount of soda ash is lower than that of the previous example, taking unto account that the attrition and slime removal operations provide a good removal of impurities, such as Al, P and Si. By disintegration, the particle size of the calcination product was adjusted for the next step of acid leaching carried out under the following conditions: HCl (50 g/l), temperature= 70° C. and time=60 minutes. The material from leaching, after separation of the liquor through filtration and drying, is the final product. As shown in Table 2, a concentrate rich in titanium and iron is obtained, with Ti recovery of 92% and Fe recovery of 84%. The beneficial effect of the use of attrition and slimes removal steps at the end of the mechanical treatment is made evident by the low content of the main contaminants given in Table 2. Based on these values, the following extraction degrees of said contaminants are calculated: 91% for barium, 84% for phosphorus, 83% for calcium, 75% for silicon and 51% for aluminium. The concentrate obtained in the present invention, with more than 50% $TiO_2$, presents a chemical composition comparable to that of some ilmenites available in the international market, as shown in Table 3.

TABLE 2

Example 2
contents (% by weight) of the main constituents
of the ore in different concentration process steps

| weight, kg | (1) 100 | (2) 30.7 | (3) 27.3 | (4) 21.7 |
|---|---|---|---|---|
| $TiO_2$ | 26.6 | 40.5 | 43.5 | 50.4 |
| $Fe_2O_3$ | 43.2 | 37.7 | 38.9 | 41.1 |
| $Al_2O_3$ | 8.72 | 6.39 | 51.1 | 3.96 |
| $P_2O_5$ | 4.56 | 4.42 | 3.29 | 0.88 |
| $SiO_2$ | 3.14 | 2.16 | 1.38 | 0.68 |
| CaO | 0.44 | 0.84 | 0.75 | 0.18 |
| BaO | 0.77 | 0.89 | 0.96 | 0.10 |
| MgO | 0.85 | 0.73 | 0.72 | 0.71 |
| MnO | N.A. | 0.68 | 0.76 | 0.51 |
| Others | 11.72 | 5.69 | 4.67 | 1.49 |

(1)—raw ore
(2)—concentrate after the magnetic separation
(3)—concentrate after the attrition and mud removal
(4)—final concentrate (after the thermo-chemical treatment)
N.A.—not available

TABLE 3

Chemical compositions of some titanium concentrates

| Compound | Present Invention | "Orissa" Ilmenite (India) | "R. Bay" Ilmenite (South Africa) |
|---|---|---|---|
| TiO2 | 50.4 | 49.7 | 49.2 |
| Fe2O3 | 41.1 | 49.4 | 51.0 |
| SiO2 | 0.68 | 0.95 | 0.58 |
| CaO | 0.18 | 0.07 | 0.02 |
| MgO | 0.71 | 0.76 | 0.52 |
| MnO | 0.51 | 0.61 | 1.0 |

The use of the concentrate provided by the present invention in the process of titanium slag manufacture can be assessed by means of a calculation based on a computer program. In such calculation, it is assumed that all titanium in the concentrate is incorporated to the slag and that all oxygen removed in the reduction reactions combines with carbon, producing gaseous carbon monoxide (CO). The results of the calculation are given in Table 4, wherein the composition of a slag produced in industrial scale can also be found. It can be seen that both materials show similar compositions, indicating that the concentrate obtained through the present invention is a suitable raw material for the production of titanium slag.

TABLE 4

Composition of the slag obtained by smelting
the concentrate of the present invention (simulation)
and that of a commercially available slag

| | % BY WEIGHT | |
|---|---|---|
| Compound | Present Invention | "Richards Bay" Slag |
| $TiO_2$ (1) | 82.5 | 85.0 |
| $Ti_2O_3$ (2) | 51.1 | 32.7 |
| FeO | 10.0 | 10.0 |
| $P_2O_5$ | 0.14 | 0.01 |
| $SiO_2$ | 1.1 | 1.6 |
| CaO | 0.29 | 0.20 |
| MgO | 1.16 | 1.10 |
| MnO | 0.83 | 1.7 |

(1) -total titanium expressed as $TiO_2$
(2) -trivalent titanium expressed as $TiO_2$

What is claimed is:

1. A process for producing titanium concentrate, wherein the predominant titanium source is anatase ore, comprising the steps of:
   calcining mechanical concentrate of anatase ore in the presence of sodium carbonate ($Na_2CO_3$) and/or potassium carbonate ($K_2CO_3$) to obtain a calcined product,
   crushing the calcined product to a particle size below 1 mm to obtain a crushed product,
   leaching the crushed product in alkaline medium with a pH in excess of 10, followed by leaching said crushed product in acid,
   wherein said acid leached product has a $Fe_2O_3$ content in the range of 40.5 to 41.1 weight percent.

2. The process of claim 1, wherein the calcination step is carried out in the temperature range of 900° C. to 1300° C., for a period of 20 to 60 minutes, with an amount of 60 to 150 kg of carbonate per metric ton of dry ore and in which oxidizing conditions are employed during said calcination step.

3. The process of claim 2, wherein the calcination step is carried out at the temperature of 1100° C. for a period of 30 minutes.

4. The process of claim 1, wherein the alkaline leaching step is done with a concentration of alkaline solvent lower than 50 g/L for a time of 60 minutes and in the temperature range of 60° C. to 90° C.

5. The process of claim 4, wherein the alkaline leaching step is done at a temperature of 70° C.

6. The process of claim 1, wherein the acid leaching step is carried out with hydrochloric acid (HCl) or sulphuric acid ($H_2SO_4$) at a concentration lower than 50 g/L, for a period of 20 to 240 minutes, and in the temperature range of 60° C. to 90° C.

7. The process of claim 6, wherein the acid leaching step is carried out for a period of 60 minutes.

8. The process of claim 7, wherein the acid leaching step is carried out at the temperature of 70° C.

9. A process for producing titanium concentrate, comprising the steps of:
   calcining mechanical concentrate of anatase ore in the presence of sodium carbonate ($Na_2CO_3$) and/or potassium carbonate ($K_2CO_3$) to obtain a calcined product,
   crushing the calcined product to a particle size below 1 mm to obtain a crushed product, leaching the crushed product in alkaline medium with a pH in excess of 10, followed by leaching the crushed product in acid, wherein said acid leached product has a $Fe_2O_3$ content in the range of 40.5 to 41.1 weight percent.

10. The process of claim 9, wherein the calcination step is carried out in the temperature range of 900° C. to 1300° C., for a period of 20 to 60 minutes, with an amount of 60 to 150 kg of carbonate per metric ton of dry ore and in which oxidizing conditions are employed during said calcination step.

11. The process of claim 10, wherein the alkaline leaching step is done with a concentration of alkaline solvent lower than 50 g/L for a time of 60 minutes and in the temperature range of 60° C. to 90° C.

12. The process of claim 11, wherein the acid leaching step is carried out with hydrochloric acid (HCl) or sulphuric acid ($H_2SO_4$) at a concentration lower than 50 g/L, for a period of 20 to 240 minutes, and in the temperature range of 60° C. to 90° C.

13. The process of claim 12, wherein:
   the calcination step is carried out at the temperature of 1100° C. for a period of 30 minutes,
   the alkaline leaching step is done at a temperature of 70° C., and
   the acid leaching step is carried out for a period of 60 minutes at the temperature of 70° C.

14. A process for producing titanium concentrate, wherein the predominant titanium source is anatase ore, comprising the steps of:
   disintegrating the anatase ore and screening to produce a classified ore size above 48 mesh,
   subjecting the classified ore to magnetic separation for removing magnetic fraction to obtain non magnetic fraction,
   subjecting the non magnetic fraction to a slime removal operation and then classifying and discarding the minus 200 mesh fraction to produce a mechanical concentrate,
   calcining the mechanical concentrate in the presence of sodium carbonate ($Na_2CO_3$) and/or potassium carbonate ($K_2CO_3$) to obtain a calcined product,
   crushing the calcined product to a particle size below 1 mm to obtain a crushed product,
   leaching the crushed product in alkaline medium with a pH in excess of 10, followed by leaching said crushed product in acid,
   wherein said acid leached product has a $Fe_2O_3$ content in the range of 40.5 to 41.1 weight percent.

15. The process of claim 14, wherein the calcination step is carried out in the temperature range of 900° C. to 1300° C., for a period of 20 to 60 minutes, with an amount of 60 to 150 kg of carbonate per metric ton of dry ore and in which oxidizing conditions are employed during said calcination step, the alkaline leaching step is done with a concentration of alkaline solvent lower than 50 g/L for a time of 60 minutes and in the temperature range of 60° C. to 90° C., and the acid leaching step is carried out with hydrochloric acid (HCl) or sulphuric acid ($H_2SO_4$) at a concentration lower than 50 g/L, for a period of 20 to 240 minutes, and in the temperature range of 60° C. to 90° C.

\* \* \* \* \*